United States Patent [19]

Yasue et al.

[11] Patent Number: 5,206,310
[45] Date of Patent: Apr. 27, 1993

[54] POLYAMIDE RESIN COMPOSITION

[76] Inventors: Kenji Yasue; Tsuneo Tamura; Akio Motoyama; Hiromasa Itakura, all of Chuo Kenkyusho, 23, Ujikozakura, Uji-shi, Kyoto, Japan

[21] Appl. No.: 645,877
[22] Filed: Jan. 25, 1991

[30] Foreign Application Priority Data

Jan. 29, 1990 [JP] Japan .................................. 2-20282

[51] Int. Cl.⁵ ............................................ C08L 77/06
[52] U.S. Cl. ..................................................... 525/432
[58] Field of Search ......................................... 525/432

[56] References Cited

FOREIGN PATENT DOCUMENTS 0248775 12/1985 Japan .................................. 525/432
2041360 2/1990 Japan .................................. 525/432

Primary Examiner—Maurice J. Welsh
Assistant Examiner—Rachel Johnson
Attorney, Agent, or Firm—Cushman, Darby & Cushman

[57] ABSTRACT

The invention relates to a polyamide resin composition comprising
(A) nylon 4.6,
(B) an aliphatic polyamide having a $CH_2/NHCO$ ratio of from 6 to 11 and
(C) a non-crystalline polyamide having a glass transition temperature of at least 100° C. The composition has a decreased water absorption while retaining high mechanical strength, heat stability and chemical resistance. Dimensional stability and mechanical properties after water absorption are unexpectedly good.

6 Claims, No Drawings

POLYAMIDE RESIN COMPOSITION

The present invention relates to a novel polyamide resin composition which is excellent in mechanical properties, heat resistance, chemical resistance and gloss of the product molded thereof and in which the dimensional change and deterioration of physical properties due to absorption of water is substantially suppressed. More particularly, it relates to a resin composition comprising (A) nylon 46, (B) an aliphatic polyamide having a methylene group/amide group ratio ($CH_2$/NHCO) in the polymer backbone chain of from 6 to 11 and (C) a non-crystalline polyamide having a glass transition temperature of at least 100° C.

The resin composition of the present invention can be applied in a wide range of fields including automobiles, electric and electronic fields and machines by injection molding, extrusion molding, blow molding or foam molding by virtue of its excellent mechanical properties, heat resistance, chemical resistance and excellent gloss of the molded product as well as the characteristic that the dimensional change and the deterioration of physical properties due to absorption of water can substantially be suppressed.

Nylon 46 made of tetramethylene diamine and adipic acid, or functional derivatives thereof, is a known polyamide. For example, EP-B-0039524 and 0038094 disclose a method for producing a nylon 46 product. This nylon 46 is known to have excellent properties as an engineering plastic, particularly excellent heat resistance. For example, its melting point is 295° C. which is not only higher than 260° C. of nylon 66, but also higher than 285° C. of polyphenylene sulfide. Its crystallinity and crystallization speed are high, and the heat distortion temperature (load: 4.5 kg/cm$^2$) is at least 280° C. which is the highest level among engineering plastics. Further, it is excellent in mechanical strength such as tensile strength and flexural strength, in sliding properties and in fatigue resistance.

However, nylon 46 has the problem that its amide group concentration is higher than nylon 66 and accordingly has a higher water absorption. Therefore, its dimensional change and deterioration of physical properties due to absorption of water are substantial, and its application in a wide range of fields including automobiles, electric and electronic fields and machines has been rather limited.

As a method for overcoming this drawback, JP-A-62 156161 discloses a method of incorporating another polyamide having a melting point of at least 200° C.. However, in such a case, no adequate reduction of the water absorption can be realized, and deterioration of the heat resistance is substantial. Furthermore, during the preparation of such a resin composition, it frequently happens that the so-called Baras effect appears, whereby compounding tends to be difficult. Further, JP-A-62 185724 proposes to incorporate a styrene polymer modified by functional groups. In this case, the water absorption can be lowered, whereby the dimensional change can be suppressed. However, the toughness which is an excellent feature of nylon 46, tends to be substantially lowered, and deterioration of the mechanical properties tends to be substantial. Further, JP-A-64 31866 discloses a resin composition comprising nylon 46, a polyester and a polyolefin modified by functional groups. In this case, the water absorption can be lowered and accordingly, the dimensional change can be suppressed, but there will be a substantial deterioration in the heat resistance which is an important characteristic of nylon 46.

As desribed above, there have been many attempts to reduce the dimensional change and the deterioration of physical properties due to absorption of water of nylon 46, but no adequate results have been obtained, or there has been the problem that the characteristics of nylon 46 such as the mechanical properties, heat resistance or toughness tend to deteriorate substantially.

Therefore, it is an object of the present invention to control the dimensional change and the deterioration of the physical properties due to absorption of water without impairing the excellent mechanical properties, heat resistance and chemical resistance of nylon 46 in dry state. Further, it is also an object of the present invention to provide molded products useful for a wide range of industrial fields including automobiles, electric and electronic fields and machines by means of such a resin composition in which the water absorption is reduced.

The present inventors have conducted an extensive research to solve the above problem and as a result, have arrived at the present invention. Namely, the present invention provides a resin composition comprising (A) nylon 46,
(B) an aliphatic polyamide having a methylene group/amide group ratio $CH_2$/NHCO) in the polymer backbone chain of from 6 to 11 and
(C) a non-crystalline polyamide having a glass transition temperature of at least 100° C.,
and satisfying the following formulae (1) and (2):

$$0.05 \leq \frac{W(B) + W(C)}{W(A) + W(B) + W(C)} \leq 0.5 \quad (1)$$

$$0.2 \leq \frac{W(C)}{W(B)} \leq 5.0 \quad (2)$$

where W(A), W(B) and W(C) represent parts by weight of the respective components (A), (B) and (C). If the compositional ratio [W(B)+W(C)]/[W(A)+W(B)+W(C)] in the formula [1] is less than 0.05, the effect of reducing the water absorption is not distinct, and accordingly, the dimensional change and physical property change due to the absorption of water by the resin composition cannot substantially be suppressed. On the other hand, if the ratio exceeds 0.5, deterioration of the heat resistance or the mechanical properties tends to be substantial, although the effect for reducing the water absorption will be significant. As shown in the formula [1], when the compositionsal ratio [W(B)+W(C)/W(A)+W(B)+W(C)] is within a range of from 0.05 to 0.5, it is possible to obtain a resin composition which is excellent in mechanical properties, heat resistance, chemical resistance and gloss of the molded product and in which the dimensional change and deterioration of physical properties due to the absorption of water is substantially suppressed.

Further, as shown in formula [2], the ratio of W(B) and W(C) i.e. [W(C)/W(B)] is also required to be within a certain range. Namely, if the ratio is less than 2.0, the so-called Baras effect tends to be appreciable during the preparation of the resin composition, and compounding tends to be difficult. On the other hand, if the ratio exceeds 5.0, the heat resistance of the resin composition tends to deteriorate substantially.

Further, to the resin composition of the present invention the usual additives, for instance a pigment, a heat stabilizer, an anti-oxidant, a weather resistant agent, a flame retardant, a plasticizer, a releasing agent, a reinforcing material, etc. may be added unless the moldability and physical properties are not impaired. The reinforcing material includes fiber reinforcing materials such as glass fibers, metal fibers, potassium titanate whiskers, carbon fibers and aramide fibers, and filler type reinforcing materials such as talc, wollastonite, calcium carbonate, mica, glass flakes and metal flakes. Particularly, glass fibers having a diameter of from 3 to 20 μm are preferred, since the strength, flexural modulus and heat resistance of the resin composition can be further improved thereby.

The method for preparing the resin composition of the present invention or the method for preparing various molded products from the resin composition of the present invention, is optional. For example, the respective components of the resin composition of the present invention may be mixed by a Banburry mixer, a tumbler mixer or any other means, and the resin composition thereby obtained may be molded by a method such as direct injection molding, extrusion molding or blow molding to obtain various molded products. Otherwise, the respective components may be mixed by a Banbury mixer, a tumbler mixer or any other means, and the composition thereby obtained may be melt-kneaded by e.g. an extruder and cut into pellets, and such pellets may then be molded by a method such as injection molding, extrusion molding or blow molding to obtain various molded products.

Nylon 46, component (A), used in the present invention is a polyamide or a polyamide mixture comprising as the main constituting units a polyamide made of tetramethylene diamine and adipic acid, or functional derivatives thereof. However, the adipic acid component or the tetramethylene diamine component may partially be substituted by other copolymer components. The copolymer components or the mixing components are not particularly limited, and known amide group-forming components may be employed.

Representative examples of the copolymer components include amino acids such as 6-aminocaproic acid, 11-aminoundecanoic acid, 12-aminododecanoic acid and p-amino methylbenzoic acid, lactams such as ε-caprolactam and ω-lauryl lactam, diamines such as hexamethylene diamine, undecamethylene diamine, dodocamethylene diamine, 2,2,4-/2,4,4-trimethylhexamethylene diamine, 5-methylnonamethylne diamine, m-xylylene diamine, p-xylylene diamine, 1,3-bis-(aminomethyl)cyclohexane, 1,4-bis(aminomethyl)cyclohexane, 1-amino-3-aminomethyl-3,5,5-trimethylcyclohexane, bis(3-methyl-4-aminocyclohexyl)methane, 2,2-bis(4-aminocyclohexyl)propane, bis(aminopropyl)-piperazine and aminoethylpiperazine, and dicarboxylic acids such as adipic acid, suberic acid, azelaic acid, sebasic acid, dodecadioic acid, terephthalic acid, isphthalic acid, 2-chloroterephthalic acid, 2-methylterephthalic acid, 5-methylisophthalic acid, 5-sodium sulfoisophthalic acid, hexahydroterephthalic acid, hexahydroisophthalic acid and diglycol.

The method for producing nylon 46 to be used in the present invention is optional. For example, it is particularly preferred to employ the one produced by the methods disclosed in EP-B-0039524, 0038094 and 0207539 and EP-B-0077106 i.e. a method wherein a prepolymer having a small amount of cyclic terminal groups is firstly produced under specific conditions, and then subjected to solid phase polymerization in e.g. a steam atmosphere to obtain highly viscous nylon 46, or a method of heating in a polar organic solvent such as 2-pyrrolidone or N-methylpyrrolidone.

There is no particular restriction as to the polymerization degree of nylon 46 to be used in the present invention. However, the relative viscosity is preferably within a range of from 1.5 to 5.5, particularly from 2.0 to 4.5 as measured at 25° C. at a concentration of 1 g/dl of 96% sulfuric acid. If the relative viscosity exceeds 5.5, the fluidity of the composition tends to be poor and processing is difficult. If the relative viscosity is lower than 1.5, there will be the drawback that the mechanical strength of the composition tends to be low.

The aliphatic polyamide of component (B) to be used in the present invention has a methylene group/amide group ratio ($CH_2/NHCO$) in the polymer backbone chain of from 6 to 11. As such a polyamide, nylon 11, nylon 12, nylon 69, nylon 610, nylon 612, nylon 613 or nylon 1212 may be mentioned. These aliphatic polyamides may be copolymerized with other monomer components, as the case requires. Among such aliphatic polyamides, nylon 12, nylon 610 and nylon 612 are used particularly preferably.

With the polyamide having a methylene group/amide group ratio ($CH_2/NHCO$) in the polymer backbone chain of at most 5, the effect for reducing the water absorption is not appreciable. On the other hand, with a polyamide having a methylene group/amide group ratio ($CH_2/NHCO$) in the polymer backbone chain of at least 12, deterioration of the heat resistance and the mechanical properties tends to be substantial, such being undesirable.

In the present invention, the non-crystalline polyamide is one which does not show a melting point, which means that its heat of fusion of crystals is generally less than 1 cal/g as measured by means of a differential thermal analyzer at a temperature raising rate of 20° C./min.

The non-crystalline polyamide component (C) to be used in the present invention is one which has a glass transition temperature of at least 100° C. in an absolutely dry state. The glass transition temperature can be obtained likewise by measuring it by means of a differential thermal analyzer at a temperature raising rate of 20° C./min. With a non-crystalline polyamide having a glass transition temperature of lower than 100° C., the improvement of the properties of the resin composition is small.

Typical examples of the diamine constituting the non-crystalline polyamide to be used in the present invention include ethylenediamine, tetramethylenediamine, hexamethylenediamine, undecamethylenediamine, dodecamethylenediamine, 2,2,4-/2,4,4-trimethylhexamethylenediamine, 5-methylnonamethylenediamine, methaxylylenediamine p-xylylenediamine, 1,3-bis(aminomethyl)cyclohexane, 1,4-bis(aminomethyl)cyclohexane, bis(4-aminocyclohexyl)-methane, 1-amino-3-aminomethyl-3,5,5-trimethylcyclohexane, bis(3-methyl-4-aminocyclohexyl)methane, 2,2-bis(4-aminocyclohexyl)propane, bis(aminopropyl)piperazine and bis(aminoethyl)piperazine.

Typical examples of the dicarboxylic acid constituting the non-crystalline polyamide to be used in the present invention include adipic acid, suberic acid, azelaic acid, sebasic acid, dodecadioic acid, terephthalic acid, isophthalic acid, 2-chloroterephthalic acid, 2- methylterephthalic acid, 5-methylisophthalic acid, 5,5-sodium sulfoisophthalic acid, hexahydroterephthalic acid, hexahydroisophthalic acid and diglycolic acid.

Typical examples of the amino acid and lactam constituting the non-crystalline polyamide to be used in the present invention include amino acids such as 6-aminocaproic acid, 11-aminoundecanoic acid, 12-aminododecanoic acid and p-aminobenzoic acid, and lactams such as ε-caprolactam en ω-lauryllactam.

Specific examples of the non-crystalline polyamide most suitable for use in the present invention include the following:

a polycondensation product of 2,2,4-/2,4,4-trimethylhexamethylene diamine and terephthalic and/or isophthalic acid, a polycondensation product of hexamethylenediamine and terephthalic and isophthalic acid, a polycondensation product of hexamethylenediamine, bis(4-aminocyclohexyl)methane and terephthalic and/or isophthalic acid, a polycondensation product of hexamethylenediamine, bis(4-methyl-4-aminocyclohexyl)methane and terephthalic and/or isophthalic acid, a polycondensation product of ε-caprolactam, bis(4-aminocyclohexyl)methane and terephthalic and/or isophthalic acid, a polycondensation product of ε-caprolactam, bis(3-methyl-4-aminocyclohexyl)methane and terephthalic and/or isophthalic acid, a polycondensation product of ω-lauryllactam, bis(4-aminocyclohexyl)methane and terephthalic and/or isophthalic acid, and a polycondensation product of ω-lauryllactam, bis(3-methyl-4-aminocyclohexyl)methane and terephthalic and/or isophthalic acid.

The blending ratio of components (A), (B) and (C) in the resin composition of the present invention is required to satisfy the formulas [1] and [2].

EXAMPLES

Now, the present invention will be described in further detail with reference to the Examples. However, the present invention is not restricted to these specific Examples. The test methods and the starting materials used in the Examples and Comparative Examples are as follows.

Flexural Properties

ASTM D 790.

Izod Impact Strength

ASTM D 256, 3.2 mm in thickness, notched.

Heat Distortion Temperature

ASTM D 678, load: 4.5 kg/cm²

Water Absorption Treatment

Treated for 24 hours at 65° C. under relative humidity of 95%.

Dimensional Change After the Water Absorption Treatment

The average dimensional change in each direction of a test piece of 50 mm in length, 50 mm in width and 3 mm in thickness was measured.

Gloss of a Molded Product

ASTM D 523, measured at an incident angle of 60°.

Chemical Resistance

The test piece used for the valuation of the dimensional change was immersed in toluene at room temperature for 165 hours, whereupon the appearance change and the weight change were examined.

Starting Materials Used

Nylon 46: F5000, manufactured by UNITICA LTD.
Nylon 66: A125, manufactured by ICI
Nylon 610: CM2001, manufactured by TORAY INDUSTRIES, INC.
Nylon 12: 3014U, manufactured by Ube Industries, Ltd.
Nylon 612: D14, manufactured by Daicelfulse Co. Ltd.
Non-crystalline polyamide
PA-1: Reference Example 1, glass transition temperature: 150° C., Trogamid T: manufactured by Dynamite Nobel Company, glass transition temperature: 148° C., polycondensation product of 2,2,4-/2,4,4-trimethylhexamethylenediamine and terephthalic acid X-21: manufactured by Mitsubishi Kasei Corporation, glass transition temperature: 125° C., polycondensation product of hexamethylenediamine, terephthalic acid and isophthalic acid TR55: manufactured by EMS Company, glass transition temperature: 152° C., polycondensation product of ω-lauryllactam, bis(3-methyl-4-aminocyclohexyl)methane and isophthalic acid.

REFERENCE EXAMPLE 1

Non-Crystalline Polyamide (PA-1)

10 kg of a starting material comprising 45 mol % of isophthalic acid, 5 mol % of terephthalic acid, 45 mol % of hexamethylenediamine and 5 mol % of bis(4-amino-3-methylcyclohexyl)methane, was charged to a reactor together with 8 kg of pure water, and the air in the reactor was purged by nitrogen a few times. Then, the temperature was raised to 90° C., and the reaction was conducted for about 5 hours. Then, while stirring the contents of the reactor under a pressure of 18 bar, the reaction temperature was gradually raised to 280° C. over a periode of 10 hours.

Then, the pressure was reduced and brought to atmospheric pressure, and the polymerization was continued at the same temperature for 6 hours. After completion of the reaction, the polymer was discharged from the reactor and cut to obtain pellets.

This copolymer polyamide showed no melting point, and its glass transition temperature was 150° C. This non-crystalline polyamide was designated as PA-1.

EXAMPLES 1 TO 5 AND COMPARATIVE EXAMPLES 1 TO 3

The respective starting materials were mixed in a tumbler at the blending ratio as shown in Table 1 and then subjected to vacuum drying at 90° C. for 16 hours. Then, each mixture was melt-kneaded at a temperature of 300° C. by means of a double screw extruder (PCM45, manufactured by Ikegai Tekko K.K.), and the kneaded product was cut to obtain pellets of the resin composition. The pellets were molded at a temperature of 300° C. by means of an injection molding machine (J100 OS, manufactured by Nikko K.K.) to obtain test pieces. The test pieces were used for measurements of various physical properties.

In Examples 1 to 5, melt-kneading of the resin composition was conducted without any trouble, and pellets were readily prepared. However, in Comparative Example 2, the Baras effect occurred during melt-kneading of the resin composition, whereby pelletizing was extremely difficult.

The results of the measurements of the physical properties are shown in Table 1. As shown specifically in Table 1, the resin compositions of the Examples according to the invention have a reduced water absorption while maintaining the mechanical properties such as the flexural strength and the izod impact strength, the heat distortion temperature and the chemical resistance of nylon 4.6. Deterioration of the physical properties after the water absorption treatment is small in comparison with nylon 46 alone. Besides, it is surprising that the dimensional change of the composition according to the invention is substantially smaller than the dimensional change expected from the water absorption as is evident from comparison with nylon 66. Further, the resin compositions of the present invention retain the excellent gloss of nylon 46.

EXAMPLES 6 TO 12

In the same manner as in Examples 1 to 5, pellets of the resin compositions as identified in Table 2 were prepared. In each of such resin compositions, pellets were readily obtained without the Baras effect. Test pieces were molded using these pellets.

The test results are shown in Table 2. As shown specifically in Table 2, the resin compositions of the Examples have their drawback i.e. the dimensional and physical property changes due to absorption of water appreciably suppressed, while substantially maintaining the properties of nylon 46 with respect to the mechanical properties, heat resistance and chemical resistance of the resin composition and the gloss of the molded product.

TABLE 1

|  | Example 1 | Example 2 | Example 3 | Example 4 | Example 5 | Comparative Example 1 | Comparative Example 2 | Comparative Example 3 |
|---|---|---|---|---|---|---|---|---|
| Incorporated amounts (Wt %) | | | | | | | | |
| Nylon 46 | 80 | 60 | 80 | 70 | 70 | 100 | 70 | — |
| Nylon 66 | — | — | — | — | — | — | — | 100 |
| Nylon 12 | 10 | 20 | — | — | — | — | 30 | — |
| Nylon 610 | — | — | 10 | 15 | 20 | — | — | — |
| PA-1 | 10 | 20 | 10 | 15 | 10 | — | — | — |
| Flexural strength (kg/cm$^2$) | 1700 | 1650 | 1750 | 1700 | 1600 | 1700 | 1300 | 1300 |
| Flexural modulus (kg/cm$^2$) | 33000 | 32000 | 33500 | 33000 | 31000 | 32000 | 26000 | 27400 |
| Izod impact strength (kg · cm/cm) | 9 | 9 | 9 | 8 | 8 | 9 | 7 | 6 |
| Heat distortion temp. (°C.) (HDT) | >280 | 278 | >280 | >280 | 274 | >280 | 243 | 227 |
| Water absorption (%) | 3.3 | 2.6 | 3.5 | 3.1 | 2.8 | 4.7 | 2.9 | 2.9 |
| After water absorption: | | | | | | | | |
| Dimensional change (%) | 0.7 | 0.4 | 0.7 | 0.6 | 0.5 | 1.2 | 0.9 | 0.9 |
| Flexural strength (kg/cm$^2$) | 700 | 730 | 750 | 760 | 740 | 560 | 480 | 540 |
| Flexural modulus (kg/cm$^2$) | 14000 | 14500 | 14300 | 14500 | 14000 | 9000 | 8500 | 8400 |
| Gloss (%) | 64 | 65 | 64 | 64 | 65 | 65 | 63 | 64 |
| Chemical resistance, | | | | | | | | |
| weight change (%) | 0.1 | 0.1 | 0.1 | 0.1 | 0.1 | 0.1 | 0.1 | 0.1 |
| appearance change | Nil | Nil | Nil | Nil | Nil | Nil | Nil | Nil |

TABLE 2

|  | Example 6 | Example 7 | Example 8 | Example 9 | Example 10 | Example 11 | Example 12 |
|---|---|---|---|---|---|---|---|
| Incorporated amounts (Wt %) | | | | | | | |
| Nylon 46 | 70 | 70 | 70 | 70 | 70 | 70 | 70 |
| Nylon 610 | 15 | 15 | 15 | — | — | — | — |
| Nylon 612 | — | — | — | 15 | 15 | — | — |
| Nylon 12 | — | — | — | — | — | 15 | 15 |
| Trogamid T | 15 | — | — | 15 | — | — | — |
| X-21 | — | 15 | — | — | 15 | 15 | — |
| TR55 | — | — | 15 | — | — | — | 15 |
| Flexural strength (kg/cm$^2$) | 1600 | 1600 | 1700 | 1600 | 1650 | 1650 | 1300 |
| Flexural modulus (kg/cm$^2$) | 31500 | 33000 | 32500 | 32000 | 31000 | 32500 | 32000 |
| Izod impact strength (kg · cm/cm) | 8 | 8 | 9 | 8 | 9 | 7 | 7 |
| Heat distortion temp. (°C.) (HDT) | >280 | >280 | >280 | >280 | >280 | >280 | >280 |
| Water absorption (%) | 3.2 | 3.1 | 3.0 | 3.1 | 3.1 | 2.9 | 3.0 |
| After water absorption: | | | | | | | |
| Dimensional change (%) | 0.6 | 0.6 | 0.6 | 0.5 | 0.6 | 0.6 | 0.5 |
| Flexural strength (kg/cm$^2$) | 750 | 770 | 750 | 740 | 740 | 730 | 720 |
| Flexural modulus (kg/cm$^2$) | 14500 | 14500 | 14000 | 14500 | 15000 | 14500 | 14200 |
| Gloss (%) | 65 | 64 | 64 | 64 | 63 | 63 | 63 |
| Chemical resistance, | | | | | | | |
| weight change (%) | 0.1 | 0.1 | 0.1 | 0.1 | 0.1 | 0.1 | 0.1 |

TABLE 2-continued

|  | Example 6 | Example 7 | Example 8 | Example 9 | Example 10 | Example 11 | Example 12 |
|---|---|---|---|---|---|---|---|
| appearance change | Nil | Nil | Nil | Nil | Nil | Nil | Nil |

We claim:

1. A polyamide resin composition comprising (A) nylon 46, (B) an aliphatic polyamide having a methylene group/amide group ratio ($CH_2/NHCO$) in the polymer backbone chain of from 6 to 11 and (C) a non-crystalline polyamide having a glass transition temperature of at least 100° C., and satisfying the following formulas (1) and (2):

$$0.05 \leq \frac{W(B) + W(C)}{W(A) + W(B) + W(C)} \leq 0.5 \quad (1)$$

$$0.2 \leq \frac{W(C)}{W(B)} \leq 5.0 \quad (2)$$

where W(A), W(B) and W(C) represent parts by weight of the respective components (A), (B) and (C).

2. A polyamide resin composition according to claim 1, characterized in that the aliphatic polyamide (B) is chosen from the group consisting of nylon 12, nylon 6.10 and nylon 6.12.

3. A polyamide resin composition according to claim 1, characterized in that the non-crystalline polyamide (C) is chosen from the group of polycondensation products of 2,2,4-/2,4,4-trimethylhexamethylene diamine and terephthalic and/or isophthalic acid, hexamethylenediamine and terephthalic and isophthalic acid, hexamethylenediamine, bis(4-aminocyclohexyl)methane and terephthalic and/or isophthalic acid, hexamethylenediamine, bis(4-methyl-4-aminocyclohexyl)-methane and terephthalic and/or isophthalic acid, ε-caprolactam, bis(4-aminocyclohexyl)methane and terephthalic and/or isophthalic acid, ε-caprolactam, bis(3-methyl-4-aminocyclohexyl)methane and terephthalic and/or isophthalic acid, ω-lauryllactam, bis(4-aminocyclohexyl)methane and terephthalic and/or isophthalic acid, and ω-lauryllactam, bis(3-methyl-4-aminocyclohexyl)methane and terephthalic and/or isophthalic acid.

4. A polyamide resin composition according to claim 1, characterized in that the nylon 4.6 has a relative viscosity of between 1.5 and 5.5, measured on a 1 gram in 100 ml 96% wt sulfuric acid solution.

5. A polyamide resin composition according to claim 4, characterized in that the nylon 4.6 has a relative viscosity of between 2.0 and 4.5.

6. Molded article obtained from a polyamide resin composition according to claim 1.

* * * * *